(12) United States Patent
Miyairi

(10) Patent No.: US 9,957,861 B2
(45) Date of Patent: May 1, 2018

(54) HONEYCOMB FILTER

(71) Applicant: NGK INSULATORS, LTD., Nagoya (JP)

(72) Inventor: Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 141 days.

(21) Appl. No.: 15/176,553

(22) Filed: Jun. 8, 2016

(65) Prior Publication Data

US 2017/0014747 A1 Jan. 19, 2017

(30) Foreign Application Priority Data

Jul. 17, 2015 (JP) ................................ 2015-143418

(51) Int. Cl.

| | |
|---|---|
| *B01D 39/14* | (2006.01) |
| *B01D 39/06* | (2006.01) |
| *B01D 39/20* | (2006.01) |
| *B01D 50/00* | (2006.01) |
| *F01N 3/022* | (2006.01) |
| *B01D 46/24* | (2006.01) |

(52) U.S. Cl.
CPC ......... *F01N 3/0222* (2013.01); *B01D 46/247* (2013.01); *B01D 46/2459* (2013.01); *B01D 46/2474* (2013.01); *B01D 2046/2433* (2013.01); *B01D 2046/2437* (2013.01)

(58) Field of Classification Search
None
See application file for complete search history.

(56) References Cited

U.S. PATENT DOCUMENTS

| | | | | |
|---|---|---|---|---|
| 4,857,089 | A | * 8/1989 | Kitagawa ........... | B01D 53/9454 422/180 |
| 6,395,370 | B1 | * 5/2002 | Noda ................. | B01D 39/2068 428/116 |
| 9,080,484 | B2 | 7/2015 | Miyairi | |
| 9,550,175 | B2 | * 1/2017 | Shibata ............... | B01D 46/247 |
| 9,707,516 | B2 | * 7/2017 | Goto .................... | B01D 53/869 |
| 2007/0231539 | A1 | * 10/2007 | Miyairi .............. | B01D 46/2429 428/116 |
| 2009/0274867 | A1 | * 11/2009 | Hiramatsu ............... | B01J 23/63 428/117 |

(Continued)

FOREIGN PATENT DOCUMENTS

JP 2014-200741 A1 10/2014

*Primary Examiner* — Amber R Orlando
(74) *Attorney, Agent, or Firm* — Burr & Brown, PLLC

(57) ABSTRACT

A honeycomb filter includes a honeycomb structure body having porous partition walls defining a plurality of cells, inflow side plugging portions, and outflow side plugging portions, and in a cross section perpendicular to a cell extending direction, the whole periphery of each of outflow cells is surrounded by an inflow cell group, inflow cells are defined by inflow/outflow partition walls which are the partition walls defining the outflow cell and inflow/inflow partition walls which are the partition walls intersecting the inflow/outflow partition walls, a surface area A1 of the inflow/outflow partition wall of the inflow cell and a surface area A2 of the inflow/inflow partition wall of the inflow cell satisfy a relation of $1.2 \leq A1/A2 \leq 2$, and in the partition wall, an average pore diameter of a surface region is from 4 to 60% of an average pore diameter of a central region.

6 Claims, 4 Drawing Sheets

(56) References Cited

U.S. PATENT DOCUMENTS

| | | | |
|---|---|---|---|
| 2012/0244042 A1* | 9/2012 | Mizutani | B01D 46/2429 422/180 |
| 2014/0165520 A1* | 6/2014 | Miyairi | C04B 35/565 55/524 |
| 2014/0298779 A1 | 10/2014 | Miyairi | |
| 2015/0033691 A1* | 2/2015 | Shibata | B01D 46/247 55/523 |
| 2015/0072104 A1* | 3/2015 | Iwasaki | B01D 46/2459 428/117 |
| 2015/0121826 A1* | 5/2015 | Jinbo | C04B 41/85 55/523 |
| 2016/0298511 A1* | 10/2016 | Imai | F01N 9/002 |

* cited by examiner

HONEYCOMB FILTER

The present application is an application based on JP-2015-143418 filed on Jul. 17, 2015 with the Japan Patent Office, the entire contents of which are incorporated herein by reference.

BACKGROUND OF THE INVENTION

Field of the Invention

The present invention relates to a honeycomb filter, and more particularly, it relates to a honeycomb filter which is excellent in regeneration efficiency and in which a pressure loss during deposition of a particulate matter is low.

Description of the Related Art

Heretofore, in an internal combustion engine, generation of cinders during combustion of fuel has raised a problem. To solve the problem, from a viewpoint of air pollution, it is considered that removal of harmful components included in an exhaust gas is required, and simultaneously, countermeasures are required to prevent a particulate matter (hereinafter abbreviated to "PM") such as soot or ash from being discharged to the atmospheric air.

In particular, there is the tendency that regulations concerning removal of the PM to be emitted from a diesel engine are strengthened worldwide, and attention is paid to use of a honeycomb filter as a trapping filter to remove the PM (hereinafter referred to as "DPF" which is an abbreviation of a diesel particulate filter). Further, various exhaust gas purifying systems have been suggested in which such honeycomb filters are used.

In the above DPF, a plurality of cells which become through channels for fluid are usually defined by porous partition walls, and the cells are alternately plugged to form a structure in which the porous partition walls defining the cells perform a function of a filter.

As this filter, there has been reported a filter or the like in which both of an initial pressure loss and a pressure loss during PM deposition are suppressed, a local temperature rise of the filter during PM burning is prevented, and generation of cracks due to thermal stress is decreased (see Patent Document 1).

[Patent Document 1] JP-A-2014-200741

SUMMARY OF THE INVENTION

A filter described in Patent Document 1 exerts excellent effects of suppressing both of an initial pressure loss and a pressure loss during PM deposition, preventing a local temperature rise of the filter during PM burning, and decreasing generation of cracks due to thermal stress.

On the other hand, in the point of providing a filter which is excellent in regeneration efficiency and in which a pressure loss during deposition of a PM is low, there is still room for improvement in the filter described in Patent Document 1.

The present invention has been developed in view of the problems of such a conventional technology. An object of the present invention is to provide a honeycomb filter which is excellent in regeneration efficiency and in which a pressure loss during deposition of a PM is low.

According to the present invention, there is provided a honeycomb filter as follows.

[1] A honeycomb filter including a honeycomb structure body having porous partition walls defining a plurality of cells which extend from an inflow end face as one end face to an outflow end face as the other end face and become through channels for fluid, inflow side plugging portions disposed in end portions of the predetermined cells on the side of the inflow end face, and outflow side plugging portions disposed in end portions of the residual cells on the side of the outflow end face, wherein the plurality of cells include outflow cells in which the inflow side plugging portions are disposed and inflow cells in which the outflow side plugging portions are disposed, and in a cross section perpendicular to a cell extending direction, the whole periphery of each of the outflow cells is surrounded by an inflow cell group including the plurality of inflow cells which are adjacent to the outflow cell via the partition walls, the inflow cells constituting the inflow cell group are defined by inflow/outflow partition walls which are the partition walls defining the outflow cell and inflow/inflow partition walls which are the partition walls intersecting the inflow/outflow partition walls, a surface area A1 of the inflow/outflow partition wall of the inflow cell and a surface area A2 of the inflow/inflow partition wall of the inflow cell satisfy a relation of $1.2 \le A1/A2 \le 2$, and in the cross section perpendicular to the cell extending direction, when a region of each partition wall from its surface on the side of the inflow cell to a position of 10% of a length of the partition wall from the surface on the inflow cell side in a thickness direction of the partition wall is defined as a surface region R1 and a region of the partition wall from a position of 40% of the length of the partition wall from the surface on the inflow cell side in the thickness direction of the partition wall to a position of 60% of the length of the partition wall from the surface on the inflow cell side in the thickness direction of the partition wall is defined as a central region R2, an average pore diameter X of the surface region R1 is from 4 to 60% of an average pore diameter Y of the central region R2.

[2] The honeycomb filter according to the above [1], wherein in the surface region R1, the average pore diameter X is 5 µm or less and a porosity is 60% or more.

[3] The honeycomb filter according to the above [1] or [2], wherein a material of the partition walls is at least one selected from the group consisting of silicon carbide, cordierite, aluminum titanate, a silicon-silicon carbide based composite material, and a silicon carbide-cordierite based composite material.

[4] The honeycomb filter according to any one of the above [1] to [3], wherein a hydraulic diameter D1 of the inflow cell and a hydraulic diameter D2 of the outflow cell satisfy a relation of $D2 > 1.5 \times D1$.

[5] The honeycomb filter according to any one of the above [1] to [4], wherein the porosity of the surface region R1 is larger than a porosity of the central region R2.

[6] The honeycomb filter according to any one of the above [1] to [5], wherein in the cross section perpendicular to the cell extending direction, when a region of each partition wall from its surface on the side of the outflow cell to a position of 10% of a length of the partition wall from the surface on the outflow cell side in the thickness direction of the partition wall is defined as a back surface region, an average pore diameter Z of the back surface region is from 4 to 60% of the average pore diameter Y of the central region R2.

In a honeycomb filter of the present invention, inflow cells and outflow cells are disposed in a predetermined state, surface areas A1 and A2 of partition walls defining the inflow cells satisfy predetermined conditions, and furthermore, an average pore diameter X of a surface region R1 satisfies a predetermined ratio to an average pore diameter Y of a central region R2. These conditions are satisfied, and hence in the honeycomb filter of the present invention, an effective geometric surface area (GSA) can be increased. As a result, the honeycomb filter of the present invention is excellent in regeneration efficiency and exerts the effect that a pressure loss during deposition of a PM is low.

DESCRIPTION OF THE PREFERRED EMBODIMENTS

Hereinafter, an embodiment of the present invention will be described. It should be understood that the present invention is not limited to the following embodiment, and the following embodiment, to which change, improvement or the like is suitably added on the basis of ordinary knowledge of a person skilled in the art without departing from the gist of the present invention, also falls in the scope of the present invention.

Figure 1:
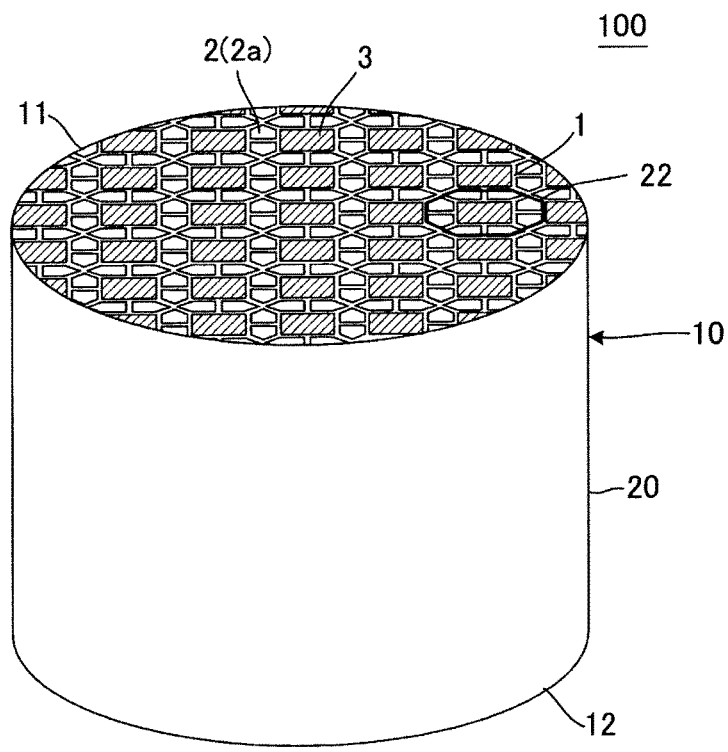
FIG. 1 is a perspective view schematically showing one embodiment of a honeycomb filter of the present invention.
Figure 2:
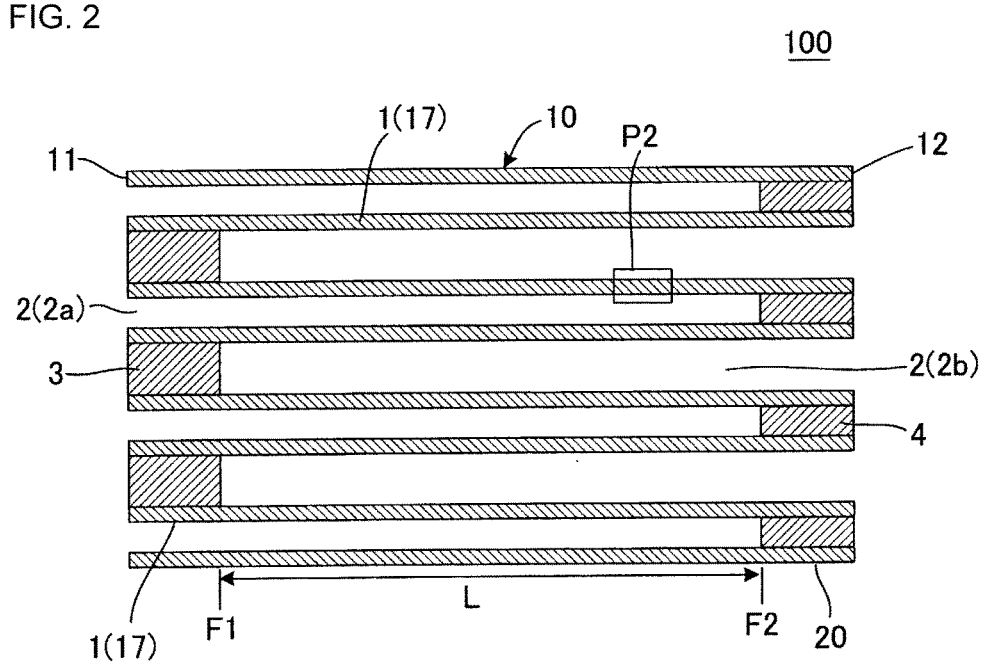
FIG. 2 is a cross-sectional view schematically showing a cross section parallel to a cell extending direction in the one embodiment of the honeycomb filter of the present invention.

[1] Honeycomb Filter:

One embodiment of a honeycomb filter of the present invention is a honeycomb filter 100 shown in FIG. 1 and FIG. 2. The honeycomb filter 100 includes a honeycomb structure body 10 having porous partition walls 1, inflow side plugging portions 3 disposed in end portions of predetermined cells 2 on the side of an inflow end face 11, and outflow side plugging portions 4 disposed in end portions of the residual cells 2 on the side of an outflow end face 12. The honeycomb structure body 10 has the porous partition walls 1 defining a plurality of cells 2 which extend from the inflow end face 11 as one end face to the outflow end face 12 as the other end face and become through channels for fluid. The plurality of cells 2 include outflow cells 2b in which the inflow side plugging portions 3 are disposed and inflow cells 2a in which the outflow side plugging portions 4 are disposed. Further, in a cross section perpendicular to an extending direction of the cells 2, the whole periphery of each of the outflow cells 2b is surrounded by an inflow cell group 15 including the plurality of inflow cells 2a which are adjacent to the outflow cell 2b via the partition walls 1.

Additionally, the inflow cells 2a constituting the inflow cell group 15 are defined by inflow/outflow partition walls 17 which are the partition walls 1 defining the outflow cell 2b and inflow/inflow partition walls 18 which are the partition walls 1 intersecting the inflow/outflow partition walls 17. It is to be noted that the inflow/inflow partition wall 18 radially extends from a center of the inflow/outflow partition wall 17 in the cross section perpendicular to the extending direction of the cells 2. Specifically, the inflow/inflow partition walls 18 include both of the partition wall perpendicular to the inflow/outflow partition wall 17 and the partition wall extending from an intersecting portion of the inflow/outflow partition walls 17 (intersecting at the intersecting portion) (see FIG. 3). A surface area A1 of the inflow/outflow partition wall 17 of the inflow cell 2a and a surface area A2 of the inflow/inflow partition wall 18 of the inflow cell satisfy a relation of $1.2 \leq A1/A2 \leq 2$. Additionally, in the cross section perpendicular to the extending direction of the cells 2, a region of each partition wall from its surface on the side of the inflow cell 2a to a position of 10% of a length of the partition wall from the surface on the side of the inflow cell 2a in a thickness direction of the partition wall 1 is defined as a surface region R1. A region of the partition wall from a position of 40% of the length of the partition wall from the surface on the side of the inflow cell 2a in the thickness direction of the partition wall 1 to a position of 60% of the length of the partition wall from the surface on the side of the inflow cell 2a in the thickness direction of the partition wall 1 is defined as a central region R2. At this time, an average pore diameter X of the surface region R1 is from 4 to 60% of an average pore diameter Y of the central region R2.

In the honeycomb filter 100, the inflow cells 2a and the outflow cells 2b are arranged in a predetermined state, and the surface areas A1 and A2 of the partition walls 1 defining the inflow cell 2a satisfy predetermined conditions. Furthermore, the average pore diameter X of the surface region R1 satisfies a predetermined ratio to the average pore diameter Y of the central region R2. These conditions are satisfied, and hence in the honeycomb filter 100, an effective geometric surface area (GSA) can be increased. As a result, the honeycomb filter 100 is excellent in regeneration efficiency, and a pressure loss during deposition of a PM decreases.

Here, soot trapped in the inflow/inflow partition walls 18 suitably burns during combustion, and hence surfaces of the inflow/inflow partition walls 18 easily reach a high temperature, and there is an effect of increasing a combustion reaction rate. On the other hand, when an amount of an exhaust gas flowing into the inflow/inflow partition walls 18 is small (see FIG. 6), an amount of the soot to be trapped in the inflow/inflow partition walls 18 is small, and the soot is hard to be deposited on the surfaces of the inflow/inflow partition walls 18. Consequently, there is a tendency that an effect of increasing a burning speed cannot suitably be utilized. Further, as a main factor which obstructs the inflow of the exhaust gas into the inflow/inflow partition walls 18, the soot intrudes into the inflow/inflow partition walls 18 in an initial stage in which the exhaust gas flows into the inflow/inflow partition walls 18, and the soot increases a permeation resistance of the inflow/inflow partition walls 18. To eliminate such a problem, pores in the surfaces of the inflow/inflow partition walls 18 are made small, so that the soot can be prevented from intruding into the inflow/inflow partition walls 18. Further, in this case, flow of the exhaust gas which permeates the outflow cells 2b along the inflow/inflow partition walls 18 (i.e., through the inflow/inflow partition walls 18) (a path of the exhaust gas) is acquired in the inflow/inflow partition walls 18. As a result, the soot can be deposited on the surfaces of the inflow/inflow partition walls 18. It is to be noted that the exhaust gas flowing into the inflow/inflow partition walls 18 permeates the outflow cells 2b along the inflow/inflow partition walls 18 as described above, or permeates the inflow/inflow partition walls 18 to flow into the adjacent inflow cells 2a (see FIG. 7).

Furthermore, in the honeycomb filter 100, the exhaust gas suitably flows in the inflow/inflow partition wall 18, and additionally, a ratio of the surface area of the inflow/inflow partition walls 18 is adjusted, so that an especially large synergistic effect can be obtained as described above.

Figure 3:
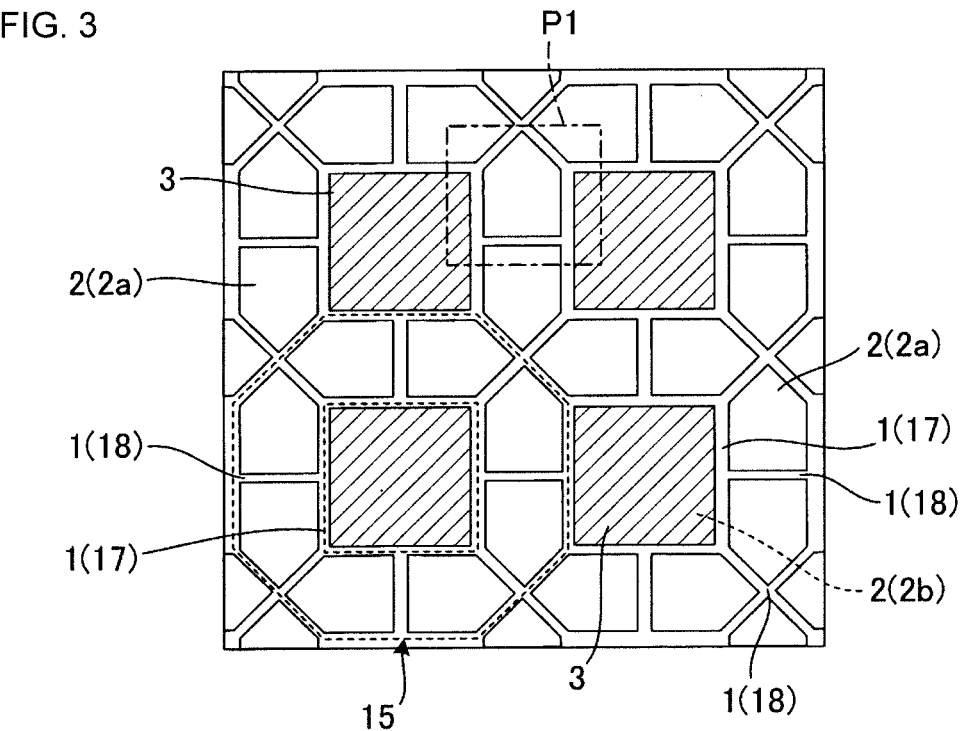
FIG. 3 is a plan view schematically showing an enlarged part of one end face of the honeycomb filter of the present invention.
Figure 4:
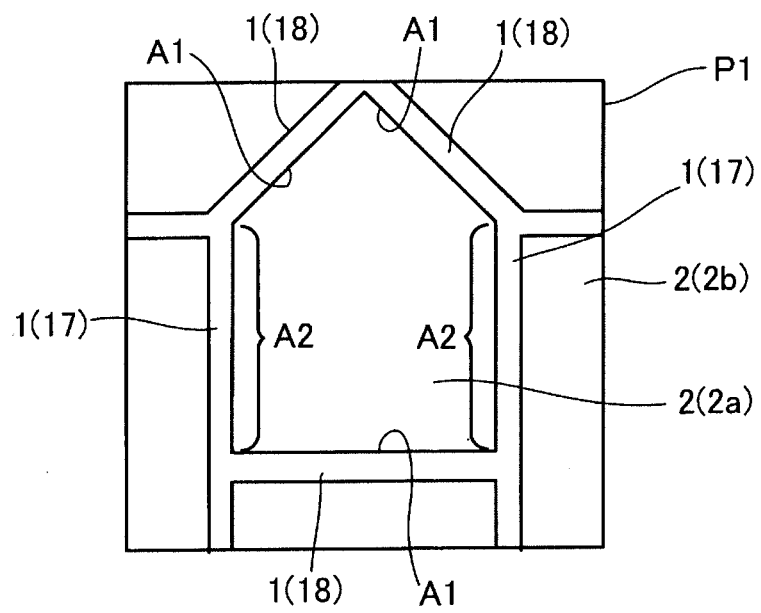
FIG. 4 is a plan view schematically showing a further enlarged part of the one end face of the honeycomb filter of the present invention.
Figure 5:
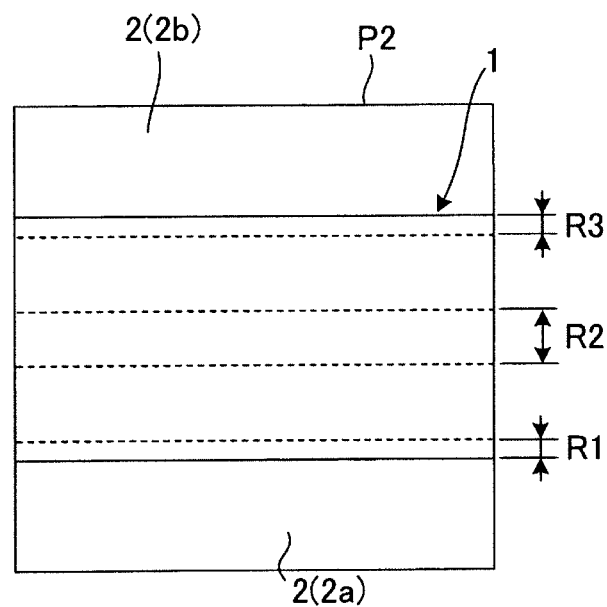
FIG. 5 is a cross-sectional view schematically showing an enlarged part of the cross section parallel to the cell extending direction in the one embodiment of the honeycomb filter of the present invention.
Figure 6:
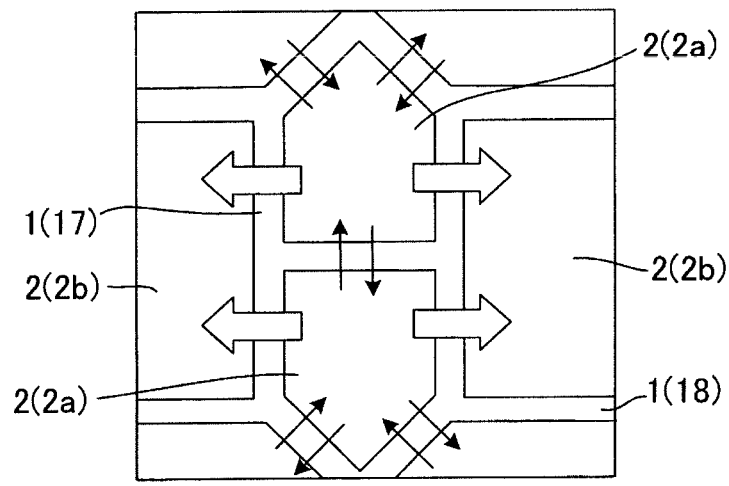
FIG. 6 is an explanatory view to schematically explain an inflow amount of an exhaust gas passing through partition walls of a conventional honeycomb filter.
Figure 7:
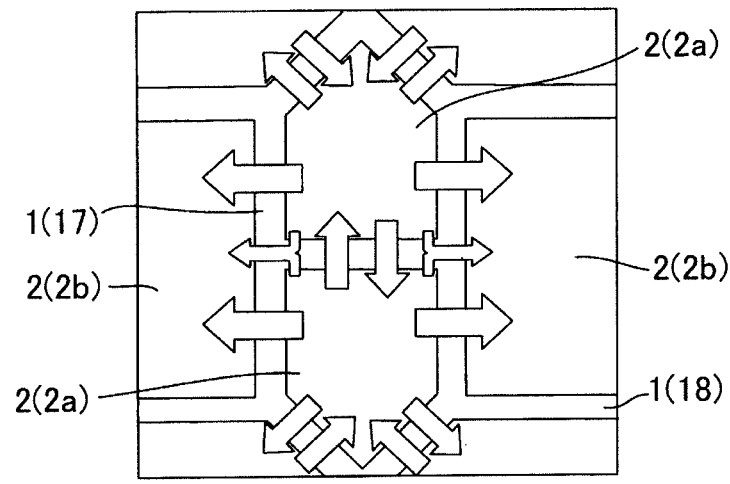
FIG. 7 is an explanatory view to schematically explain an inflow amount of an exhaust gas passing through partition walls of the one embodiment of the honeycomb filter of the present invention.

FIG. 1 is a perspective view schematically showing one embodiment of the honeycomb filter of the present invention. FIG. 2 is a cross-sectional view schematically showing a cross section parallel to a cell extending direction in the one embodiment of the honeycomb filter of the present invention. FIG. 3 is a plan view schematically showing an enlarged part of one end face of the honeycomb filter of the present invention. FIG. 4 is a plan view schematically showing a further enlarged part (a region P1) of the one end face of the honeycomb filter of the present invention. FIG. 5 is a cross-sectional view schematically showing an enlarged part (a region P2 (see FIG. 2)) of the cross section parallel to the cell extending direction in the one embodiment of the honeycomb filter of the present invention. FIG. 6 is an explanatory view to schematically explain an inflow amount of an exhaust gas passing through partition walls of a conventional honeycomb filter. FIG. 7 is an explanatory view to schematically explain an inflow amount of an exhaust gas passing through partition walls of the one embodiment of the honeycomb filter of the present invention. It is to be noted that arrows in FIG. 6 and FIG. 7 show the flow of the exhaust gas, and it is indicated that the thicker (larger) the arrow is, the larger the inflow amount of the exhaust gas is. Additionally, in FIG. 4, FIG. 6 and FIG. 7, the plugging portions are omitted.

As shown in FIG. 6, the inflow amount of the exhaust gas passing through the partition walls of the conventional honeycomb filter in inflow/inflow partition walls 18 is smaller than the inflow amount of the exhaust gas in inflow/outflow partition walls 17. On the other hand, in the honeycomb filter of the present invention, about the same amount of exhaust gas flows into the inflow/inflow partition walls 18 and the inflow/outflow partition walls 17 as shown in FIG. 7.

[1-1] Honeycomb Structure Body:

The whole periphery of each of the outflow cells 2b formed in the honeycomb structure body 10 is surrounded by the inflow cell group 15 including the plurality of inflow cells 2a adjacent to the outflow cell 2b via the partition walls 1. That is, the whole periphery of each outflow cell 2b is surrounded by the inflow cell group 15, and the inflow cell group 15 is separated from the outflow cell 2b via the partition walls 1 (the inflow/outflow partition walls 17). That is, the exhaust gas flowing into the inflow cell group 15 passes through the partition walls to flow into the outflow cell 2b. It is to be noted that the exhaust gas flowing into the inflow cell group 15 flows not only into the outflow cell 2b but also into the respective inflow cells 2a constituting the inflow cell group 15.

Further, the inflow cells 2a constituting the inflow cell group 15 are defined by the inflow/outflow partition walls 17 which are the partition walls 1 defining the outflow cell 2b and the inflow/inflow partition walls 18 which are the partition walls 1 intersecting the inflow/outflow partition walls 17. Consequently, as described above, the exhaust gas flowing into the inflow cell group 15 flows into the outflow cell 2b, and additionally passes through the inflow/inflow partition walls 18 to also flow into the respective inflow cells 2a. When the exhaust gas passes through the partition walls in this manner, the PM is removed to purify the exhaust gas.

As described above, the surface area A1 of the inflow/outflow partition wall 17 of the inflow cell 2a and the surface area A2 of the inflow/inflow partition wall 18 of the inflow cell satisfy the relation of $1.2 \leq A1/A2 \leq 2$. Further, the surface areas A1 and A2 preferably satisfy a relation of $1.3 \leq A1/A2 \leq 1.8$, and further preferably satisfy a relation of $1.4 \leq A1/A2 \leq 1.8$.

It is to be noted that the surface area A1 is a value calculated as follows. First, a sample is cut out from the honeycomb filter to include a surface vertical to the cell extending direction, and this surface vertical to the cell extending direction is polished. Next, this polished surface is photographed with a scanning electron microscope (SEM). Next, in the above polished surface, "a region S1 of an integer multiple of a cell repeating unit" is assumed. Further, a length f of the surface area A1 in the region S1 is measured. Afterward, the length f is multiplied by a ratio (S2/S1) of a total sectional area S2 of the honeycomb filter (including open areas of the cells) to the region S1, and further multiplied by "a length L (see FIG. 2) of the honeycomb filter excluding a region occupied by the plugging portions". That is, there is calculated an equation: $A1 = f \times (S2/S1) \times L$. The value calculated in this manner is defined as "the surface area A1". The surface area A2 is a similarly calculated value.

Figure 8:
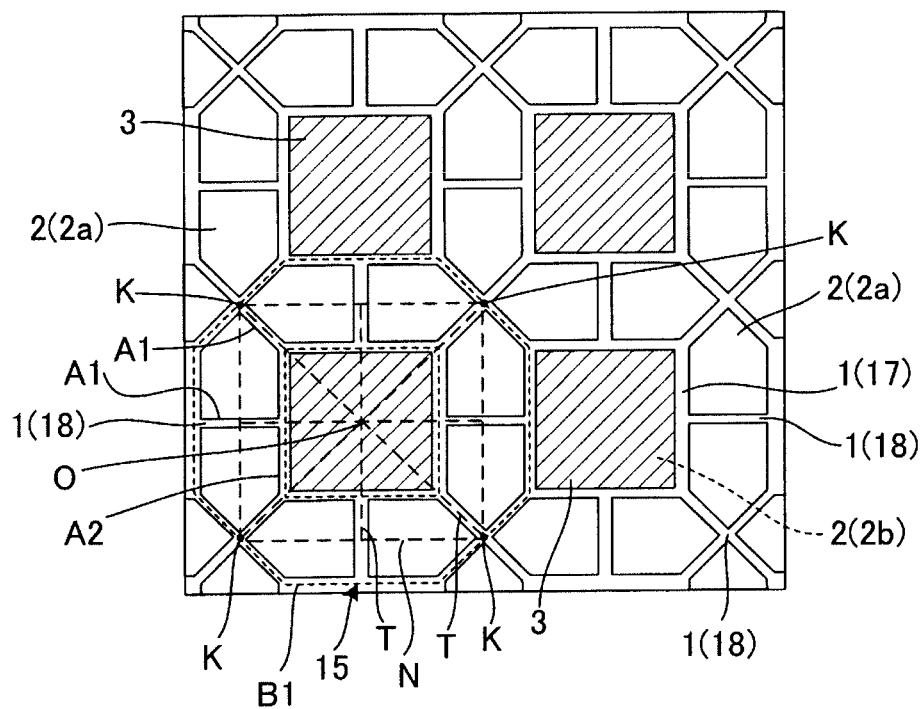
FIG. 8 is a plan view schematically showing an enlarged part of the one end face of the honeycomb filter of the present invention.

"The region S1 of the integer multiple of the cell repeating unit" is determined as follows. This will be described with reference to FIG. 8. That is, first in the end face of the honeycomb filter, a border line B1 of one cell group 22 is assumed. Afterward, intersection points K of the inflow/inflow partition walls 18 are defined as vertexes to assume an inscribed quadrangular shape N inscribed with the border line B1. Afterward, there are assumed a plurality of defining lines T passing a center O of the one cell group 22 and extending along the inflow/inflow partition walls 18. At this time, one inflow cell 2a is present between the adjacent defining lines T. Further, a triangular region surrounded by the adjacent defining lines T and the inscribed quadrangular shape N is defined as "the region S1 of the integer multiple of the cell repeating unit". FIG. 8 is a plan view schematically showing an enlarged part of the one end face of the honeycomb filter of the present invention.

"The length of the honeycomb filter excluding the region occupied by the plugging portions" means a distance between the deepest position F1 of the plugging portion disposed in the inflow cell and the deepest position F2 of the plugging portion disposed in the outflow cell.

Additionally, the average pore diameter X of the surface region R1 is from 4 to 60%, preferably from 10 to 50%, and further preferably from 10 to 40% of the average pore diameter Y of the central region R2. In such ranges, the regeneration efficiency improves.

It is to be noted that "the average pore diameter" in the honeycomb filter of the present specification is a value measured as follows. First, a sample is cut out from the honeycomb filter to include a surface vertical to the cell extending direction, and afterward, this surface vertical to the cell extending direction is polished. Next, the polished surface is photographed with the SEM. Next, an average pore diameter of a region of 10% or less of a distance from the surface (the surface region R1) is calculated by image analysis. Next, an average pore diameter of a region of 40 to 60% of the distance from the surface (the central region R2) is calculated by the image analysis. In this way, the average pore diameters of the surface region R1 and the central region R2 and an average pore diameter of a back surface region R3 can be measured, respectively.

Further, the honeycomb filter of the present invention satisfies these conditions of "A1/A2" and "the ratio of the average pore diameter X", and hence the effective geometric surface area (GSA) can be increased. As a result, the honeycomb filter of the present invention is excellent in regeneration efficiency, and the pressure loss during the deposition of the PM decreases.

Additionally, a region of each partition wall from its surface on the outflow cell side to a position of 10% of the length of the partition wall from the surface on the outflow cell side in the thickness direction of the partition wall is defined as the back surface region R3. At this time, according to the honeycomb filter of the present invention, in the cross section perpendicular to the cell extending direction, an average pore diameter Z of the back surface region R3 is preferably from 4 to 60%, more preferably from 10 to 50%, and further preferably from 10 to 40% of the average pore diameter Y of the central region R2. When such conditions are satisfied, a trapping efficiency improves.

A hydraulic diameter of each inflow cell is preferably from 0.5 to 3 mm and further preferably from 1 to 2.5 mm. When the hydraulic diameter of the inflow cell is smaller than 0.5 mm, there is the fear that an open end of the inflow cell is closed with the soot to increase the pressure loss. When the hydraulic diameter of the inflow cell is in excess of 3 mm, there is the fear that an effective utilization ratio of the partition walls decreases and the pressure loss during the deposition of the soot increases.

A hydraulic diameter D1 of each inflow cell and a hydraulic diameter D2 of each outflow cell preferably satisfy a relation of D2>1.5×D1, and further preferably satisfy a relation of D2>1.6×D1. In such ranges, when the exhaust gas permeates the partition walls to flow from the inflow cells into the outflow cells, diffusion of the exhaust gas occurs in the outflow cells. In this way, the diffusing flow of the exhaust gas is formed in the outflow cells to decrease the pressure loss, and hence the pressure loss of the filter decreases.

Here, "the hydraulic diameter of each cell" is a value calculated by 4×(a sectional area of one cell)/(a sum of peripheral lengths in one cell cross section).

In the honeycomb filter of the present invention, there is not any special restriction on a cell shape (a sectional shape) in the cross section perpendicular to the cell extending direction. For example, the sectional shape of the inflow cell can be a polygonal shape such as a quadrangular shape, a pentangular shape, a hexagonal shape, or an octagonal shape. Additionally, the sectional shape of the outflow cell can be a polygonal shape such as a quadrangular shape, a pentangular shape, a hexagonal shape, or an octagonal shape. Further, the sectional shape of the inflow cell may be the same as the sectional shape of the outflow cell or may be different therefrom. Among these shapes, it is preferable that the sectional shape of the inflow cell is pentangular or hexagonal and the sectional shape of the outflow cell is quadrangular. In this case, the honeycomb filter of the present invention is excellent in regeneration efficiency and the pressure loss during the deposition of the PM decreases.

FIG. 1 and FIG. 3 show an example where the outflow cells 2b having a quadrangular sectional shape and the inflow cells 2a having a pentangular sectional shape are arranged. The inflow cell group 15 constituted of the plurality of inflow cells 2a is disposed to surround the whole periphery of the outflow cell 2b in the cross section perpendicular to the extending direction of the cells 2. That is, the inflow cells 2a are always present around each outflow cell 2b. It is to be noted that in the one cell group 22 constituted of the one outflow cell 2b and the inflow cell group 15 including the plurality of inflow cells 2a surrounding the outflow cell 2b, a shape (the sectional shape) of the cross section perpendicular to the extending direction of the cells 2 is preferably octagonal.

In the outflow cells 2b, as shown in FIG. 3, it is preferable that the partition walls 1 are arranged vertically and horizontally to face each other. Further, the inflow cell 2a and the outflow cell 2b are disposed adjacent to each other via the partition walls 1 defining these cells (the inflow cell 2a and the outflow cell 2b).

In the surface region R1, it is preferable that the average pore diameter is 5 μm or less and a porosity is 60% or more, and it is further preferable that the average pore diameter is from 1 to 5 μm and the porosity is from 60 to 90%. When these conditions are satisfied, the pressure loss during the deposition of the soot decreases, and a burning efficiency of the soot improves. In a case where the average pore diameter and the porosity do not satisfy the above ranges in the surface region R1, there is the fear that the pressure loss during the deposition of the soot increases and the burning efficiency of the soot decreases.

A porosity of the partition walls is preferably from 30 to 70% and further preferably from 35 to 68%. When the porosity of the partition walls is smaller than 30%, there is the fear that the pressure loss increases. When the porosity is in excess of 70%, there is the fear that strength runs short. The porosity of all the partition walls is a value measured by a mercury porosimeter. It is to be noted that the porosity of the surface region R1 and a porosity of the central region R2 are values measured by an after-mentioned method.

It is preferable that the porosity of the surface region R1 is larger than the porosity of the central region R2. When such conditions are satisfied, the pressure loss during the deposition of the soot decreases. It is to be noted that the porosity of the surface region R1 and the porosity of the central region R2 are values measured as follows. First, a sample is cut out from the honeycomb filter to include a surface vertical to the cell extending direction, and afterward, this surface vertical to the cell extending direction is polished. Next, the polished surface is photographed with the SEM. Afterward, image processing is performed to binarize a material portion and a pore portion by the image analysis and the porosity is calculated from an area ratio between the material portion and the pore portion. In this way, the porosity of the surface region R1 and the porosity of the central region R2 are measured.

The porosity of the central region R2 of each partition wall is specifically preferably from 30 to 70% and further preferably from 35 to 68%. When the porosity of the central region R2 of the partition wall is smaller than 30%, there is the fear that the pressure loss increases. When the porosity is in excess of 70%, there is the fear that the strength runs short.

There is not any special restriction on a thickness of the partition walls (the inflow/inflow partition walls and the inflow/outflow partition walls). It is preferable that the thickness is, for example, from 50 to 600 μm. When the thickness of the partition walls is smaller than 50 μm, there is the fear that the strength runs short. On the other hand, when the thickness is in excess of 600 μm, there is the fear that the pressure loss increases.

A material of the partition walls is preferably ceramics because the material is excellent in strength and heat resistance, and examples of the material include silicon carbide, cordierite, aluminum titanate, a silicon-silicon carbide based composite material, a silicon carbide-cordierite based composite material, mullite, alumina, and silicon nitride. The material is preferably at least one selected from the group consisting of silicon carbide, cordierite, aluminum titanate, the silicon-silicon carbide based composite material, and the silicon carbide-cordierite based composite material.

The honeycomb structure body may be a bonded body constituted of a plurality of honeycomb segments (a honeycomb segment bonded body). That is, the honeycomb structure body includes an assembly of the plurality of honeycomb segments, and a bonding portion made of a bonding material which bonds these honeycomb segments to one another.

The honeycomb filter 100 may further include a circumferential wall 20 (see FIG. 1) on a side surface of the honeycomb structure body 10.

[1-2] Plugging Portion:

The honeycomb filter of the present invention includes the inflow side plugging portions and the outflow side plugging portions. A material of these plugging portions can be similar to the abovementioned material of the partition walls.

Additionally, depths of the inflow side plugging portions and the outflow side plugging portions can suitably be determined.

[2] Manufacturing Method of Honeycomb Filter:

A manufacturing method of the honeycomb filter of the present embodiment will be described. First, a kneaded material to prepare the honeycomb filter is prepared, and this kneaded material is formed to prepare a honeycomb formed body (a forming step). Next, the obtained honeycomb formed body (or a honeycomb dried body after dried as required) is plugged to form the plugging portions (the inflow side plugging portions and the outflow side plugging portions) (a plugging portion forming step). Next, the surface of an unfired partition wall base material in the residual cells of the honeycomb formed body is coated with a slurry in which a surface region R1 forming ceramic raw material and flammable particulates are dispersed in water or the like (a slurry coating step). Next, the honeycomb formed body coated with a trapping layer forming raw material is fired, so that the honeycomb filter can be prepared (a honeycomb filter preparing step).

Hereinafter, the manufacturing method of a honeycomb structure of the present embodiment will be described every step.

[2-1] Forming Step:

First, in the forming step, a ceramic forming raw material containing a ceramic raw material is formed to form the honeycomb formed body so that a plurality of cells which become through channels for fluid are defined.

The ceramic raw material contained in the ceramic forming raw material preferably includes at least one selected from the group consisting of silicon carbide, cordierite, aluminum titanate, a silicon-silicon carbide based composite material, a silicon carbide-cordierite based composite material, mullite, alumina, and silicon nitride. It is to be noted that a cordierite forming raw material is the ceramic raw material blended in a chemical composition in which silica falls in a range of 42 to 56 mass %, alumina falls in a range of 30 to 45 mass % and magnesia falls in a range of 12 to 16 mass %, and the cordierite forming raw material is fired to become cordierite.

This ceramic forming raw material is preferably prepared by mixing the above ceramic raw material with a dispersing medium, an organic binder, an inorganic binder, a pore former, a surfactant and the like. There is not any special restriction on a composition ratio of each raw material, and the composition ratio is preferably adjusted in accordance with a structure, a material or the like of the honeycomb filter to be prepared.

Each raw material is further preferably prepared as follows to adjust a pore surface area, an average pore diameter and a porosity of the partition wall base material of the honeycomb structure to be prepared.

Talc, kaolin, alumina or silica is preferably used as the ceramic raw material. An average particle diameter of talc is preferably from 10 to 30 μm. An average particle diameter of kaolin is preferably from 1 to 10 μm. An average particle diameter of alumina is preferably from 1 to 20 μm. An average particle diameter of silica is preferably from 1 to 60 μm. Additionally, as the pore former, there is preferably used starch, carbon, a foamable resin, polymethyl methacrylate (PMMA), a water absorbable resin or any combination of them. Additionally, an average particle diameter of the pore former is preferably from 10 to 100 μm. In addition, an amount of the pore former to be added is preferably from 0.5 to 10 parts by mass to 100 parts by mass of the ceramic raw material. Additionally, as the organic binder, there is preferably used methylcellulose, hydroxypropyl methylcellulose, hydroxypropyl ethylcellulose, hydroxyethylcellulose, carboxymethylcellulose, polyvinyl alcohol or any combination of them. Additionally, an amount of the organic binder to be added is preferably from 1 to 10 parts by mass to 100 parts by mass of the ceramic raw material.

When the ceramic forming raw material is formed, it is preferable that the forming raw material is first kneaded to obtain a kneaded material and the obtained kneaded material is formed into a honeycomb shape. There is not any special restriction on a method of kneading the forming raw material to form the kneaded material, and an example of the method is a method in which a kneader, a vacuum pugmill or the like is used. There is not any special restriction on a method of forming the kneaded material to form the honeycomb formed body, and a heretofore known forming method such as extrusion or injection molding is usable. An example of the method is preferably a method of performing the extrusion by use of a die having desirable cell shape, partition wall thickness and cell density to form the honeycomb formed body.

There is not any special restriction on a shape of the honeycomb formed body, and examples of the shape include a round pillar shape and a pillar shape in which a cross section perpendicular to a central axis has an elliptic shape, a race track shape, or a polygonal shape such as a triangular shape, a quadrangular shape, a pentangular shape, a hexagonal shape or an octagonal shape.

The obtained honeycomb formed body may be dried. There is not any special restriction on a drying method, but examples of the method include hot air drying, microwave drying, induction drying, reduced pressure drying, vacuum drying and freeze drying. Above all, it is preferable that the induction drying, the microwave drying or the hot air drying is performed alone or any combination of them is performed.

It is to be noted that the honeycomb formed body is fired after the partition walls are coated with the trapping layer forming raw material, and the firing is not performed before the partition walls are coated with the trapping layer forming raw material.

[2-2] Plugging Portion Forming Step:

Next, the plugging portions are formed in the honeycomb formed body (the honeycomb dried body in a case where a drying step is employed). Specifically, first, an inflow end face of the honeycomb formed body is masked so that inflow cells are covered and outflow cells are not covered. Afterward, a masked end portion (an inflow end portion) is immersed into plugging slurry. Further, the plugging slurry is charged into open ends of the outflow cells which are not masked. Afterward, an outflow end face of the honeycomb formed body is masked so that the inflow cells are not covered and the outflow cells are covered. Afterward, a masked end portion (an outflow end portion) is immersed into the plugging slurry to charge the plugging slurry into open ends of the inflow cells which are not masked. In consequence, it is possible to obtain the honeycomb formed body in which the plugging portions are formed.

As the plugging slurry, a material of plugging portions of a heretofore known honeycomb filter can suitably be selected and used. Additionally, it is described that in the present step, both of each inflow side plugging portion and each outflow side plugging portion are disposed, but the slurry coating step is performed before both of these plugging portions are disposed.

[2-3] Slurry Coating Step:

Next, in the honeycomb formed body (or a one side plugged honeycomb formed body in which the plugging portions are formed only on one end face side), the surface of an unfired partition wall base material in the residual cells in which the plugging portions are not disposed is coated with the slurry in which the surface region R1 forming ceramic raw material and flammable particulates are dispersed in water. The cells in which the plugging portions are not disposed are referred to as "the residual cells" and the above "predetermined cells" are combined with "the residual cells" to constitute all the cells. Further, the "residual cells 2" become the inflow cells 2a. It is to be noted that not only the surface of the unfired partition wall base material in the inflow cells 2a but also the surface of the unfired partition wall base material in the outflow cells 2b may be coated with the trapping layer forming raw material to form an unfired trapping layer.

Examples of the flammable particulates include carbon black, acrylic resin, styrene resin, and urethane resin. In particular, as the flammable particulates, carbon black is preferable.

An average particle diameter of the flammable particulates is preferably from 0.05 to 0.5 µm, further preferably from 0.05 to 0.3 µm, and especially preferably from 0.05 to 0.2 µm. When the average particle diameter of the flammable particulates is large, there is the fear that uniformity of a thickness of a portion which becomes the surface region R1 deteriorates in a cross section of the honeycomb structure body which is vertical to the cell extending direction. On the other hand, there is not any special restriction on a lower limit value of the average particle diameter of the flammable particulates. However, a lower limit value of an average particle diameter of actually available flammable particulates is about 0.05 µm. It is to be noted that the average particle diameter of the flammable particulates is a value measured by a laser diffraction scattering method.

A volume ratio between the surface region R1 forming ceramic raw material and the flammable particulates is preferably from 20/80 to 80/20, further preferably from 30/70 to 70/30, and especially preferably from 30/70 to 60/40. When the ratio of the flammable particulates is excessively large, the porosity of the surface region R1 of each partition wall might excessively increase. On the other hand, when the ratio of the flammable particulates is excessively small, there is the fear that the uniformity of the thickness of the surface region R1 of the partition wall deteriorates in the cross section of the honeycomb structure body which is vertical to the cell extending direction.

The surface region R1 forming ceramic raw material is further preferably at least one selected from the group consisting of a cordierite forming raw material, cordierite, silicon carbide, mullite, alumina, spinel, aluminum titanate, silicon nitride, zirconia, titania, zirconium silicate, and silica. Above all, the material is further preferably at least one selected from the group consisting of silicon carbide, cordierite and aluminum titanate.

An average particle diameter of the surface region R1 forming ceramic raw material is preferably from 1 to 10 µm and further preferably from 1 to 8 µm. When the average particle diameter of the surface region R1 forming ceramic raw material is smaller than 1 µm, pores excessively become small and the permeation resistance of the exhaust gas excessively increases. As a result, there is the fear that the pressure loss increases. When the average particle diameter is in excess of 10 µm, the pores excessively become large, and hence the trapping efficiency decreases. Furthermore, there is the fear that the pressure loss during the deposition of the soot increases and the burning efficiency of the soot deteriorates. It is to be noted that the average particle diameter of the surface region R1 forming ceramic raw material is a value measured by the laser diffraction scattering method.

In addition to the trapping layer forming ceramic raw material and the flammable particulates, the pore former may be added.

As the pore former, polymethyl methacrylate (PMMA), carbon, starch or the like is usable. In these pore formers, PMMA is preferable. A content of the pore former is preferably from 5 to 1000 parts by mass, further preferably from 10 to 100 parts by mass, and especially preferably from 40 to 80 parts by mass to 100 parts by mass of the surface region R1 forming ceramic raw material. When the content is smaller than 5 parts by mass, an initial pressure loss might increase. When the content is larger than 1000 parts by mass, an initial trapping efficiency might decrease.

An average particle diameter of the pore former is preferably from 0.5 to 50 µm, further preferably from 5 to 30 µm, and especially preferably from 5 to 20 µm. When the average particle diameter is larger than 50 µm, the initial trapping efficiency might decrease. When the average particle diameter is smaller than 0.5 µm, the initial pressure loss might increase. The average particle diameter of the pore former is a value measured by the laser diffraction scattering method.

[2-4] Honeycomb Filter Preparing Step:

Next, the obtained honeycomb formed body is fired to obtain the honeycomb filter.

It is preferable that the honeycomb formed body is calcinated before the honeycomb formed body is fired (main firing). The calcinating is performed for degreasing, and there is not any special restriction on a calcinating method as long as contained organic materials (an organic binder, a dispersing agent, a pore former, etc.) can be removed. In general, a burning temperature of the organic binder is from about 100 to 300° C. and a burning temperature of the pore former is from about 200 to 800° C., and hence as calcinating conditions, it is preferable that heating is performed at about 200 to 1000° C. in an oxidizing atmosphere for about 3 to 100 hours.

For the firing (the main firing) of the honeycomb formed body, appropriate conditions may be selected. For example, in a case where the cordierite forming raw material is used, a firing temperature is preferably from 1410 to 1440° C. Additionally, for a firing time, a time to keep a maximum temperature is preferably from 4 to 6 hours.

EXAMPLES

Hereinafter, the present invention will specifically be described on the basis of examples, but the present invention is not limited to these examples.

Example 1

As a ceramic raw material, a mixture of silicon carbide (SiC) powder and metal silicon (Si) powder at a mass ratio of 80:20 was prepared. To this mixed raw material, hydroxypropyl methylcellulose was added as a binder, a water absorbable resin was added as a pore former, and water was further added, to prepare a forming raw material. The obtained forming raw material was kneaded by using a kneader to obtain a kneaded material.

Next, the obtained kneaded material was formed by using a vacuum extruder, to prepare 16 quadrangular prismatic columnar honeycomb segments having a cell sectional structure shown in FIG. 1. In each of the obtained honeycomb segments, each end face had a vertical size of 35 mm×a horizontal size of 35 mm and a length in a cell extending direction was 152 mm.

Next, for the obtained honeycomb segments, high frequency induction heating and drying were performed, followed by drying with a hot air drier at 120° C. for 2 hours, to obtain honeycomb segment intermediate bodies.

Next, coating films were formed on the surfaces of through channels which became inflow cells of the obtained honeycomb segment intermediate bodies. Afterward, the above coating films were dried to obtain honeycomb segment dried bodies.

Next, plugging portions were formed in one end portion (an inflow end portion) of each obtained honeycomb structure dried body. First, one end face (an inflow end face) of the honeycomb structure dried body was masked so that the inflow cells were covered and outflow cells were not covered. Afterward, the masked end portion was immersed into plugging slurry. In this way, the plugging slurry was charged into open ends of the cells (the outflow cells) which were not masked. Consequently, one side plugged honeycomb segment dried bodies were obtained.

Next, the surface of an unfired partition wall base material in the residual cells which were not plugged in each one side plugged honeycomb segment dried body was coated with a slurry in which a surface region R1 forming ceramic raw material, flammable particulates and a pore former were dispersed in water (a film preparing slurry prior to firing). In this way, slurry coated segments were obtained.

Additionally, as the surface region R1 forming ceramic raw material, silicon carbide (an average particle diameter of 5 μm) was used. In addition, as the flammable particulates, carbon black (an average particle diameter of 1 μm) was used. Additionally, a volume ratio between the surface region R1 forming ceramic raw material and the flammable particulates was 95:5. Furthermore, starch (an average particle diameter of 0.5 μm) was used as the pore former. A content of the pore former was 10 parts by mass to 100 parts by mass of the surface region R1 forming ceramic raw material.

Next, plugging portions were formed in the other end portion (an outflow end portion) of each obtained slurry coated segment. First, the other end face (an outflow end face) of each one side plugged honeycomb segment dried body was masked so that the inflow cells were not covered and the outflow cells were covered. Afterward, the masked end portion was immersed into the plugging slurry. In this way, the plugging slurry was charged into open ends of the cells (the inflow cells) which were not masked. In consequence, both side plugged honeycomb segment dried bodies were obtained.

Further, the obtained both side plugged honeycomb segment dried bodies were degreased and fired to obtain honeycomb segment fired bodies. On degreasing conditions, the degreasing was performed at 400° C. for 5 hours. Additionally, on firing conditions, the firing was performed at 1450° C. under argon atmosphere for 2 hours.

16 honeycomb segment fired bodies were integrally bonded by using a bonding material to obtain a quadrangular prismatic columnar honeycomb segment bonded body. The bonding material included inorganic particles and an inorganic adhesive as main components, and included an organic binder, a surfactant, a foamable resin, water and the like in addition to these main components. Afterward, a circumference of the obtained quadrangular prismatic columnar honeycomb segment bonded body was ground and processed in a round pillar shape. Afterward, a circumferential surface of the round pillar-shaped honeycomb segment bonded body was coated with a coating material, to obtain a honeycomb filter. A diameter of each end face of this honeycomb filter was 143 mm. As the coating material, a material including ceramics powder, water and a bonding agent was used.

FIG. 1 shows an arrangement state of cells in a cross section perpendicular to an extending direction of the cells of this honeycomb filter. In this honeycomb filter, a value (A1/A2) of a ratio between a surface area A1 of inflow/outflow partition walls of the inflow cells and a surface area A2 of inflow/inflow partition walls of the inflow cells was 1.5. Additionally, this "A1/A2" was calculated as follows. A sample was cut out from the honeycomb filter to include a surface vertical to the cell extending direction, and this surface vertical to the cell extending direction was polished. Next, this polished surface was photographed with a scanning electron microscope (SEM). Next, there was measured a total of contour lengths of surfaces of inflow/outflow cells in a region S1 of an integer multiple of a cell repeating unit. Afterward, the total was multiplied by a total sectional area S2 of the honeycomb filter and multiplied by a length of the honeycomb filter excluding a region occupied by the plugging portions. A value calculated in this manner was defined as "the surface area A1". The surface area A2 was a similarly calculated value. From these values, "A1/A2" was calculated.

In this honeycomb filter, an average pore diameter X of a surface region R1 was 3 μm and an average pore diameter Y of a central region R2 was 13 μm. Further, the average pore diameter X of the surface region R1 was 23% of the average pore diameter Y of the central region R2. Additionally, the average pore diameter X of the surface region R1 and the average pore diameter Y of the central region R2 were calculated as follows. First, a sample was cut out from the honeycomb filter to include a surface vertical to the cell extending direction, and afterward, this surface vertical to the cell extending direction was polished. Next, the polished surface was photographed with the SEM. Next, average particle diameters in the respective regions (the surface region R1 and the central region R2) were calculated by image analysis. Specifically, there were optionally selected 10 viewing fields (vertically 20 μm and horizontally 20 μm) in a region of 10% or less from the surface (the surface region R1) and 5 pores in each viewing field were optionally selected. An average value of pore diameters of the pores in each viewing field was calculated, and then an average of "the average values of the pore diameters" of the respective viewing fields was calculated to obtain the average pore diameter in the surface region R1. Also for the central region R2, in the same manner as in the surface region R1, 10 viewing fields (vertically 100 μm and horizontally 100 μm) were optionally selected, 5 pores in each viewing field were optionally selected, and an average was calculated to obtain the average pore diameter in the central region R2. Afterward, from these values, a ratio of the average pore diameter X to the average pore diameter Y was calculated.

A porosity of the surface region R1 was 40% and a porosity of the central region R2 was 40%. That is, the porosity of the surface region R1 is larger than the porosity of the central region R2.

A hydraulic diameter D1 of the inflow cell was 1.45 and a hydraulic diameter D2 of the outflow cell was 2.2. Further, a value of the hydraulic diameter D2/the hydraulic diameter D1 was 1.52. That is, the hydraulic diameters D1 and D2 satisfied a relation of D2>1.5×D1.

As to thicknesses of partition walls, the thickness of the inflow/outflow partition wall was 0.34 mm and the thickness of the inflow/inflow partition wall was 0.34 mm. Additionally, a weight of the honeycomb filter was 1.6 kg.

As to each obtained honeycomb filter, "regeneration efficiency" and "a pressure loss after PM deposition" were evaluated by methods mentioned below. Table 1 shows the results.

(Regeneration Efficiency)

In a state where 6 g/L of soot was deposited on the partition walls of the honeycomb filter, a high temperature gas was passed from an inflow end face of the honeycomb filter to carry out forced regeneration of the filter. As conditions of the forced regeneration, a gas temperature in the inflow end face was set to 650° C. and a gas passing time was set to 15 minutes. Additionally, prior to the forced regeneration, there was measured a mass of the honeycomb filter in the state where the soot was deposited. After the forced regeneration, a mass of the honeycomb filter was measured and a mass of the soot which disappeared due to the forced regeneration was obtained. From a mass M1 of the deposited soot and a mass M2 of the soot which disappeared due to the forced regeneration, the regeneration efficiency (M2/M1×100) was obtained.

A case where the regeneration efficiency was in excess of 90% was evaluated as "A". A case where the regeneration efficiency was in excess of 80% and 90% or less was evaluated as "B". A case where the regeneration efficiency was 80% or less was evaluated as "C". Table 1 shows the results.

(Pressure Loss (kPa) during PM Deposition)

Light oil was burnt in an oxygen lacking state to generate soot, a soot containing burning gas was adjusted by adding diluting air to a burning gas in which an amount of the soot to be generated was 50 g/hour, a flow rate was 50 Nm$^3$/minute and a temperature was 300° C., and the burning gas flowed into the honeycomb filter. There was calculated a pressure difference between an inflow side and an outflow side when an amount of the soot deposited in the honeycomb filter was 4 g/L, and from this calculated value, the pressure loss during the PM deposition was measured.

A case where this pressure loss was smaller than 7 kPa was evaluated as "A". A case where the pressure loss was 7 kPa or more and smaller than 9 kPa was evaluated as "B". A case where the pressure loss was 9 kPa or more and smaller than 11 kPa was evaluated as "C". Table 1 shows the results.

In Table 1, "a cell shape" shows a combination (an outflow cell-an inflow cell) of shapes of the outflow cell and the inflow cell in a cross section perpendicular to an extending direction of cells. That is, for example, "quadrangular-pentangular" shows that the shape (a sectional shape) of the outflow cell in the cross section perpendicular to the cell extending direction is "quadrangular" and the shape (a sectional shape) of the inflow cell in the cross section perpendicular to the cell extending direction is "pentangular". Specifically, in the honeycomb filter of Example 1, as shown in FIG. 1, there are arranged the inflow cells having the pentangular sectional shape and the outflow cells having the quadrangular sectional shape. Further, in the honeycomb filter of Example 1, more specifically, there are arranged the outflow cells having the quadrangular sectional shape and a plurality of inflow cells disposed to surround this outflow cell and having the pentangular sectional shape. "A surface treatment" shows a control method of surface pores. This control method is specifically a method in which an average pore diameter of a surface region is adjusted to be smaller than an average pore diameter of a central region, and prior to firing, the surface region is coated with a slurry including raw materials having small particle diameters (a film preparing slurry prior to the firing) to form a film prepared prior to the firing (a surface layer mentioned below). Further, "the film preparation prior to the firing" in a column of "the surface treatment" shows that the surface layer is formed on a both side plugged honeycomb segment dried body before fired. Additionally, "none" in the column of "the surface treatment" shows that the surface pores are not controlled and the surface region R1 and the central region R2 have an equal pore state.

TABLE 1

| | Material | Mass kg | Cell shape | A1/A2 | Ave. pore dia. Y of central region μm | Ave. pore dia. X of surface region μm | Ave. particle dia. X/ave. particle dia. Y % | Ave. pore dia. Z of back surface region μm | Ave. particle dia. Z/ave. particle dia. Y % | Porosity of surface region % | Porosity of central region % | Hydraulic dia. D1 of inflow cell mm | Hydraulic dia. D2 of outflow cell mm | D2/D1 |
|---|---|---|---|---|---|---|---|---|---|---|---|---|---|---|
| Example 1 | Si—SiC | 1.6 | Quadrangular-pentangular | 1.5 | 13 | 3 | 23 | 13 | 100 | 40 | 40 | 1.45 | 2.20 | 1.52 |
| Example 2 | Si—SiC | 1.6 | Quadrangular-pentangular | 1.2 | 13 | 3 | 23 | 13 | 100 | 40 | 40 | 1.30 | 2.40 | 1.85 |
| Example 3 | Si—SiC | 1.6 | Quadrangular-pentangular | 2 | 13 | 3 | 23 | 13 | 100 | 40 | 40 | 1.60 | 2.00 | 1.25 |
| Example 4 | Si—SiC | 1.6 | Quadrangular-pentangular | 1.5 | 13 | 7.5 | 58 | 13 | 100 | 40 | 40 | 1.45 | 2.20 | 1.52 |
| Example 5 | Si—SiC | 1.6 | Quadrangular-pentangular | 1.5 | 13 | 0.5 | 4 | 13 | 100 | 40 | 40 | 1.45 | 2.20 | 1.52 |
| Example 6 | Si—SiC | 1.6 | Quadrangular-pentangular | 1.5 | 13 | 3 | 23 | 13 | 100 | 60 | 40 | 1.45 | 2.20 | 1.52 |
| Comparative Example 1 | Si—SiC | 1.6 | Quadrangular-pentangular | 1.5 | 13 | 8 | 62 | 13 | 100 | 40 | 40 | 1.45 | 2.20 | 1.52 |
| Comparative Example 2 | Si—SiC | 1.6 | Quadrangular-pentangular | 1.5 | 13 | 0.4 | 3 | 13 | 100 | 40 | 40 | 1.45 | 2.20 | 1.52 |
| Comparative Example 3 | Si—SiC | 1.6 | Quadrangular-pentangular | 1.5 | 13 | 13 | 100 | 13 | 100 | 40 | 40 | 1.45 | 2.20 | 1.52 |
| Comparative Example 4 | Si—SiC | 1.6 | Quadrangular-quadrangular | 0 | 13 | 3 | 23 | 13 | 100 | 40 | 40 | 1.50 | 1.50 | 1.00 |
| Comparative Example 5 | Si—SiC | 1.6 | Quadrangular-octagonal | 0.1 | 13 | 3 | 23 | 13 | 100 | 40 | 40 | 1.60 | 1.40 | 0.88 |
| Comparative Example 6 | Si—SiC | 1.6 | Quadrangular-pentangular | 1.6 | 13 | 13 | 100 | 13 | 100 | 40 | 40 | 1.70 | 1.90 | 1.12 |
| Comparative Example 7 | Si—SiC | 1.6 | Quadrangular-pentangular | 1.1 | 13 | 8 | 62 | 13 | 100 | 40 | 40 | 0.60 | 2.80 | 4.67 |
| Comparative Example 8 | Si—SiC | 1.6 | Quadrangular-pentangular | 1.1 | 13 | 7.5 | 58 | 13 | 100 | 40 | 40 | 0.60 | 2.80 | 4.67 |
| Comparative Example 9 | Si—SiC | 1.6 | Quadrangular-pentangular | 1.1 | 13 | 3 | 23 | 13 | 100 | 40 | 40 | 0.60 | 2.80 | 4.67 |
| Comparative Example 10 | Si—SiC | 1.6 | Quadrangular-pentangular | 1.1 | 13 | 0.5 | 4 | 13 | 100 | 40 | 40 | 0.60 | 2.80 | 4.67 |
| Comparative Example 11 | Si—SiC | 1.6 | Quadrangular-octagonal | 0.1 | 13 | 13 | 100 | 13 | 100 | 40 | 40 | 1.60 | 1.40 | 0.88 |
| Comparative Example 12 | Si—SiC | 1.6 | Quadrangular-octagonal | 0.1 | 13 | 8 | 62 | 13 | 100 | 40 | 40 | 1.60 | 1.40 | 0.88 |
| Comparative Example 13 | Si—SiC | 1.6 | Quadrangular-octagonal | 0.1 | 13 | 7.5 | 58 | 13 | 100 | 40 | 40 | 1.60 | 1.40 | 0.88 |
| Comparative Example 14 | Si—SiC | 1.6 | Quadrangular-octagonal | 0.1 | 13 | 3 | 23 | 13 | 100 | 40 | 40 | 1.60 | 1.40 | 0.88 |
| Comparative Example 15 | Si—SiC | 1.6 | Quadrangular-octagonal | 0.1 | 13 | 0.5 | 4 | 13 | 100 | 40 | 40 | 1.60 | 1.40 | 0.88 |
| Comparative Example 16 | Si—SiC | 1.6 | Quadrangular-octagonal | 0.1 | 13 | 0.5 | 3 | 13 | 100 | 40 | 40 | 1.60 | 1.40 | 0.88 |
| Comparative Example 17 | Si—SiC | 1.6 | Quadrangular-octagonal | 0.1 | 13 | 3 | 23 | 13 | 100 | 40 | 40 | 1.60 | 1.40 | 0.88 |
| Comparative Example 18 | Si—SiC | 16 | Quadrangular-octagonal | 2.1 | 13 | 3 | 23 | 13.0 | 100 | 40 | 40 | 1.60 | 2.30 | 1.44 |

TABLE 2

| | Surface treatment | Regeneration efficiency % | E-valuation | Pressure loss after PM deposition kPa | E-valuation |
|---|---|---|---|---|---|
| Example 1 | Film preparation prior to firing | 95 | A | 4.0 | A |
| Example 2 | Film preparation prior to firing | 95 | A | 4.2 | A |
| Example 3 | Film preparation prior to firing | 95 | A | 4.3 | A |
| Example 4 | Film preparation prior to firing | 93 | A | 5.0 | A |
| Example 5 | Film preparation prior to firing | 92 | A | 4.4 | A |
| Example 6 | Film preparation prior to firing | 97 | A | 3.8 | A |
| Comparative Example 1 | Film preparation prior to firing | 75 | C | 7.4 | B |
| Comparative Example 2 | Film preparation prior to firing | 76 | C | 7.3 | B |
| Comparative Example 3 | None | 70 | C | 7.5 | B |
| Comparative Example 4 | Film preparation prior to firing | 80 | C | 9.4 | C |
| Comparative Example 5 | Film preparation prior to firing | 80 | C | 8.5 | B |
| Comparative Example 6 | Film preparation prior to firing | 75 | C | 9.4 | C |
| Comparative Example 7 | None | 75 | C | 9.4 | C |
| Comparative Example 8 | Film preparation prior to firing | 80 | C | 9.8 | C |
| Comparative Example 9 | Film preparation prior to firing | 81 | B | 9.2 | C |
| Comparative Example 10 | Film preparation prior to firing | 80 | C | 8.5 | B |
| Comparative Example 11 | Film preparation prior to firing | 70 | C | 9.5 | C |
| Comparative Example 12 | None | 78 | C | 9.8 | C |
| Comparative Example 13 | Film preparation prior to firing | 78 | C | 10.2 | C |
| Comparative Example 14 | Film preparation prior to firing | 79 | C | 9.2 | C |
| Comparative Example 15 | Film preparation prior to firing | 78 | C | 8.2 | B |
| Comparative Example 16 | Film preparation prior to firing | 75 | C | 8.5 | B |
| Comparative Example 17 | Film preparation prior to firing | 73 | C | 10.0 | C |
| Comparative Example 18 | Film preparation prior to firing | 73 | C | 10.1 | C |

Examples 2 to 6 and Comparative Examples 1 to 18

The procedure of Example 1 was repeated except that changes were made as shown in Table 1, to evaluate "regeneration efficiency" and "a pressure loss after PM deposition". Table 2 shows the results.

It is seen from Table 2 that each of the honeycomb filters of Examples 1 to 6 is excellent in regeneration efficiency and the pressure loss during the deposition of the particulate matter is low, as compared with the honeycomb filters of Comparative Examples 1 to 18.

A honeycomb filter of the present invention can be employed as a filter which purifies an exhaust gas to be emitted from a car or the like.

DESCRIPTION OF REFERENCE NUMERALS

1: partition wall, 2: cell, 2a: inflow cell, 2b: outflow cell, 3: inflow side plugging portion, 4: outflow side plugging portion, 10: honeycomb structure body, 11: inflow end face, 12: outflow end face, 15: inflow cell group, 17: inflow/outflow partition wall, 18: inflow/inflow partition wall, 20: circumferential wall, 22: cell group, 100: honeycomb filter, B1: border line, F1 and F2: deepest position of the plugging portion, K: intersection point, L: length of the honeycomb filter excluding a region occupied by the plugging portions, N: inscribed quadrangular shape, O: center, P1 and P2: region, R1: surface region, R2: central region, R3: back surface region, and T: defining line.

What is claimed is:

1. A honeycomb filter comprising:
a honeycomb structure body having porous partition walls defining a plurality of cells which extend from an inflow end face as one end face to an outflow end face as the other end face and become through channels for fluid;
inflow side plugging portions disposed in end portions of the predetermined cells on the side of the inflow end face; and
outflow side plugging portions disposed in end portions of the residual cells on the side of the outflow end face,
wherein the plurality of cells comprise outflow cells in which the inflow side plugging portions are disposed and inflow cells in which the outflow side plugging portions are disposed,
in a cross section perpendicular to a cell extending direction, the whole periphery of each of the outflow cells is surrounded by an inflow cell group comprising the plurality of inflow cells which are adjacent to the outflow cell via the partition walls,
the inflow cells constituting the inflow cell group are defined by inflow/outflow partition walls which are the partition walls defining the outflow cell and inflow/inflow partition walls which are the partition walls intersecting the inflow/outflow partition walls,
a surface area A1 of the inflow/outflow partition wall of the inflow cell and a surface area A2 of the inflow/inflow partition wall of the inflow cell satisfy a relation of $1.2 \leq A1/A2 \leq 2$, and
in the cross section perpendicular to the cell extending direction, when a region of each partition wall from its surface on the side of the inflow cell to a position of 10% of a length of the partition wall from the surface on the inflow cell side in a thickness direction of the partition wall is defined as a surface region R1 and a region of the partition wall from a position of 40% of the length of the partition wall from the surface on the inflow cell side in the thickness direction of the partition wall to a position of 60% of the length of the partition wall from the surface on the inflow cell side in the thickness direction of the partition wall is defined as a central region R2, an average pore diameter X of the surface region R1 is from 4 to 60% of an average pore diameter Y of the central region R2.

2. The honeycomb filter according to claim 1, wherein in the surface region R1, the average pore diameter X is 5 μm or less and a porosity is 60% or more.

3. The honeycomb filter according to claim 1, wherein a material of the partition walls is at least one selected from the group consisting of silicon carbide, cordierite, aluminum titanate, a silicon-silicon carbide based composite material, and a silicon carbide-cordierite based composite material.

4. The honeycomb filter according to claim 1, wherein a hydraulic diameter D1 of the inflow cell and a hydraulic diameter D2 of the outflow cell satisfy a relation of $D2 > 1.5 \times D1$.

5. The honeycomb filter according to claim 1, wherein the porosity of the surface region R1 is larger than a porosity of the central region R2.

6. The honeycomb filter according to claim 1, wherein in the cross section perpendicular to the cell extending direction, when a region of each partition wall from its surface on the side of the outflow cell to a position of 10% of a length of the partition wall from the surface on the outflow cell side in the thickness direction of the partition wall is defined as a back surface region, an average pore diameter Z of the back surface region is from 4 to 60% of the average pore diameter Y of the central region R2.

* * * * *